United States Patent
Yamashita et al.

(10) Patent No.: US 10,020,018 B2
(45) Date of Patent: Jul. 10, 2018

(54) DSD DECODER AND AUDIO SYSTEM

(71) Applicant: ROHM CO., LTD., Ukyo-Ku, Kyoto (JP)

(72) Inventors: Shinsuke Yamashita, Kyoto (JP); Takashi Adachi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 11 days.

(21) Appl. No.: 15/133,770

(22) Filed: Apr. 20, 2016

(65) Prior Publication Data

US 2016/0322056 A1 Nov. 3, 2016

(30) Foreign Application Priority Data

May 1, 2015 (JP) .................................. 2015-094312

(51) Int. Cl.
G10L 19/00 (2013.01)
G10L 19/002 (2013.01)
G11B 20/00 (2006.01)

(52) U.S. Cl.
CPC .............. *G11B 20/00007* (2013.01); *G11B 2020/00014* (2013.01)

(58) Field of Classification Search
CPC .............. G11B 20/00007; G11B 20/00; G11B 20/00014; G11B 20/00021; G11B 20/00028; G11B 20/00036; G11B 20/00043; G11B 20/0005; G11B 20/00057; G11B 20/00065; G11B 20/00072; G11B 20/00079; G06F 13/28; G06F 13/385; G06F 12/08; G06F 13/128; H04L 49/90; G11C 7/1072
USPC ............ 704/500–504, 7, 201, 211–216, 267, 704/243–244, 221, E19.048, E15.048, 704/E13.005; 710/21–22, 308, 51–52
See application file for complete search history.

(56) References Cited

U.S. PATENT DOCUMENTS

| | | | | |
|---|---|---|---|---|
| 4,777,591 A | * | 10/1988 | Chang | G06F 13/128 710/119 |
| 8,671,329 B2 | * | 3/2014 | Kumar | G06F 11/1052 365/189.02 |
| 2008/0005386 A1 | * | 1/2008 | Matsuda | G06F 13/28 710/22 |

FOREIGN PATENT DOCUMENTS

JP 2006079742 A 3/2006

OTHER PUBLICATIONS

NN8811130, Service Processor Architecture and Microcode Algorithm for Performing Console Customization Under Customer Control, IBM Technical Disclosure Bulletin, vol. 31, Issue 6, p. 130, Nov. 1, 1988, US.*

\* cited by examiner

*Primary Examiner* — Chan S Park
*Assistant Examiner* — Stephen M Brinich
(74) *Attorney, Agent, or Firm* — Cantor Colburn LLP

(57) ABSTRACT

A decoder that decodes DSD (Direct Stream Digital) data including: a memory storing the DSD data; a processor; a DMA (Direct Memory Access) controller configured to read the DSD data from the memory one word at a time according to a command from the processor; a parallel/serial converter configured to output a plurality of bits contained in a word read by the DMA controller in a bit stream format; and a silent pattern generator configured to selectively output a plurality of silent patterns in a time division manner during a silence period, wherein each of the plurality of silent patterns has a mark rate of 50% and is a string of bits having different values.

10 Claims, 9 Drawing Sheets

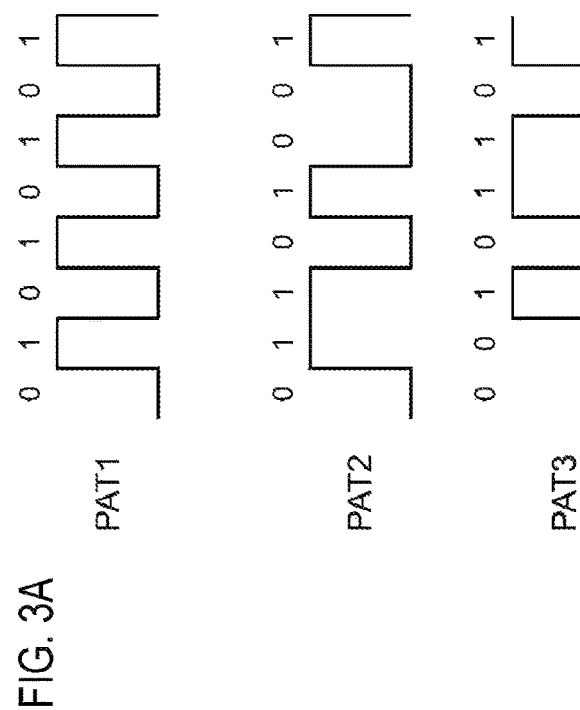
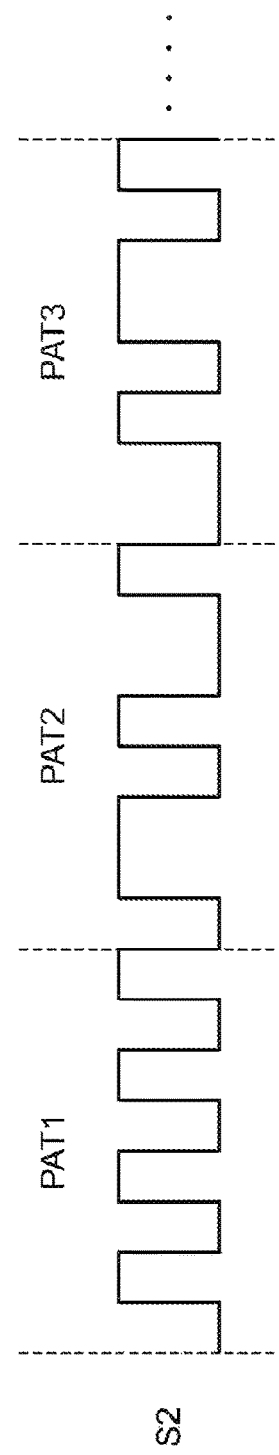
FIG. 3A
FIG. 3B

DSD DECODER AND AUDIO SYSTEM

CROSS-REFERENCE TO RELATED APPLICATION(S)

This application is based upon and claims the benefit of priority from Japanese Patent Application No. 2015-94312, filed on May 1, 2015, the entire contents of which are incorporated herein by reference.

TECHNICAL FIELD

The present disclosure relates to a decoder that decodes DSD (Direct Stream Digital) data.

BACKGROUND

In recent years, with advances in high resolution of sound sources in the audio field, a DSD scheme has attracted attention as a high quality audio data encoding scheme. The DSD scheme has been conventionally employed in SACD (Super Audio CD). However, as the DSD scheme is employed for network delivery of audio data, a high quality sound reproduction system for the DSD scheme is required.

The DSD scheme, which is a kind of PDM (Pulse Density Modulation), can convert an audio waveform into a bit stream through one-bit pulse density modulation and, in principle, can reproduce the original audio waveform by passing the bit stream through a low pass filter.

FIG. 1 is a block diagram of an audio system 100 that reproduces DSD data. Audio data encoded with a DSD scheme are stored in a storage 102. The storage 102 may be a PC or a USB memory. A DSD decoder 200 reads the audio data stored in the storage 102 for each predetermined unit (one sector). The DSD decoder 200 converts the read audio data S1 into audio data S2 of a bit stream format and outputs the audio data S2. A D/A converter 300 converts the audio data S2 of the bit stream format into an analog audio signal S3. An amplifier 104 amplifies the analog audio signal S3 and drives a speaker 106.

A mute function is implemented to prevent a noise from being output from the speaker 106 in a silent state between songs. The present inventors have examined the two following schemes for implementation of the mute function.

The first scheme is to connect the DSD decoder 200 with the D/A converter 300 via a control signal line 108 and switch an electrical state (e.g., a signal level) of the control signal line 108 between a mute state and a non-mute state. The D/A converter 300 reporting the mute state fixes its output S3 such that no noise is output from the speaker 106. However, this scheme has a problem in that the number of pins of the DSD decoder 200 and the D/A converter 300 may be increased or the signal line 108 for mute control is necessary in addition to a line for transfer of the bit stream data S2.

The second scheme is to generate the bit stream data S2 having a predetermined pattern (referred to as a silent pattern) from the DSD decoder 200 in the mute state. A detector that detects the silent pattern is incorporated in the D/A converter 300. The detector determines that it is in a mute state if the silent pattern is repeated several times.

The second scheme may have a problem of noise radiation since the same pattern (bit string) is repeated in the mute state. In addition, if a vendor of the DSD decoder 200 and a vendor of the D/A converter 300 are different from each other, there is a problem in that a mute function does not work when there is a mismatch between a silent pattern output by the DSD decoder 200 and a silent pattern expected by the D/A converter 300.

SUMMARY

The present disclosure provides some embodiments of a DSD decoder which is capable of reducing radiation noise.

According to one embodiment of the present disclosure, there is provided a decoder that decodes DSD (Direct Stream Digital) data. The decoder includes: a memory storing the DSD data; a processor; a DMA (Direct Memory Access) controller configured to read the DSD data from the memory one word at a time according to a command from the processor; a parallel/serial converter configured to output a plurality of bits contained in a word read by the DMA controller in a bit stream format; and a silent pattern generator configured to selectively output a plurality of silent patterns in a time division manner during a silence period. Each of the plurality of silent patterns has a mark rate of 50% and is a string of bits having different values.

With this configuration, by outputting different silent patterns in a time division manner, it is possible to spread a spectrum and reduce radiation noise. A "value"" of a pattern (bit string) refers to a value in hexadecimal (or decimal, or binary).

The silent patterns may be set in software. Therefore, versatility of the DSD decoder can be increased by changing the silent patterns generated by the DSD decoder according to D/A converters used in combination.

According to another embodiment of the present disclosure, there is provided a decoder including: a memory storing the DSD data; a processor; a DMA (Direct Memory Access) controller configured to read the DSD data from the memory one word at a time according to a command from the processor; a parallel/serial converter configured to output a plurality of bits contained in a word read by the DMA controller in a bit stream format; and a silent pattern generator configured to generate silent patterns during a silence period, each of the silent patterns having a mark rate of 50% and being a string of bits whose values are set from outside.

With this configuration, versatility of the DSD decoder can be increased by changing the silent patterns generated by the DSD decoder according to D/A converters used in combination.

The DMA controller may be configured to switch between (i) a first mode in which the word is output without change and (ii) a second mode in which an arrangement order of bits contained in the word is inverted and a rearranged word is output. The processor may operate the DMA controller in the first mode when a flag, which indicates an arrangement order of bits and is contained in a header of a file storing the DSD data, indicates the MSB (Most Significant Bit) first and operate the DMA controller in the second mode when the flag indicates the LSB (Least Significant Bit) first. If the bit rearrangement is in charge of a software process by the processor, since a computing load of the processor is increased, there may be a problem in that power consumption is increased with an increase in the operation frequency of the processor. However, with this configuration, since the bit rearrangement function is implemented in the DMA controller, it is possible to reduce the computing load of the processor. Thus, the operation frequency of the processor is lowered and power consumption is reduced.

The parallel/serial converter may be configured to switch between (i) a first mode in which the word output from the DMA controller is converted into a serial bit string without change and (ii) a second mode in which bits contained in the word are replaced and converted into a serial bit string. The processor may operate the parallel/serial converter in the first mode when a flag, which indicates an arrangement order of bits and is contained in a header of a file storing the DSD data, indicates the MSB (Most Significant Bit) first and operate the parallel/serial converter in the second mode when the flag indicates the LSB (Least Significant Bit) first. With this configuration, since the bit rearrangement function is implemented in the parallel/serial converter, it is possible to reduce the computing load of the processor. Thus, the operation frequency of the processor is lowered and power consumption is reduced.

According to another embodiment of the present disclosure, there is provided an audio system including: the above-described decoder; and a D/A converter configured to convert decoded DSD data output from the decoder into an analog signal. A clock signal for serial transfer may be supplied from the D/A converter to the decoder, and the parallel/serial converter may output the decoded DSD data in synchronization with the clock signal.

With this configuration, it is possible to prevent an overflow and an underflow due to a deviation between a clock frequency of the decoder at a front stage and a clock frequency of the D/A converter at a rear stage from occurring, which can result in improvement of sound quality.

The audio system may further include a storage storing an audio file of a DSD format. The decoder may include an interface circuit which receives the DSD data from the storage and stores the received DSD data in the memory.

The storage may be equipped in a computer. The interface circuit may output data indicating a transfer rate of the DSD data to the computer. Since the interface circuit adjusts the data transfer rate of the computer according to progress of a process in the decoder, it is possible to prevent an overflow and an underflow and further improve sound quality.

According to another embodiment of the present disclosure, there is provided a decoder including: a memory storing the DSD data; a processor; a DMA (Direct Memory Access) controller configured to read the DSD data from the memory one word at a time according to a command from the processor; and a parallel/serial converter configured to output a plurality of bits contained in a word read by the DMA controller in a bit stream format. The DMA controller is configured to switch between (i) a first mode in which the one word is output without change and (ii) a second mode in which an arrangement order of bits contained in the word is inverted and a rearranged word is output. The processor operates the DMA controller in the first mode when a flag, which indicates an arrangement order of bits and is contained in a header of a file storing the DSD data, indicates the MSB (Most Significant Bit) first and operates the DMA controller in the second mode when the flag indicates the LSB (Least Significant Bit) first.

According to another embodiment of the present disclosure, there is provided a decoder including: a memory storing the DSD data; a processor; a DMA (Direct Memory Access) controller configured to read the DSD data from the memory one word at a time according to a command from the processor; and a parallel/serial converter configured to output a plurality of bits contained in a word read by the DMA controller in a bit stream format. The parallel/serial converter is configured to switch between (i) a first mode in which the word output from the DMA controller is converted into a serial bit string without change and (ii) a second mode in which bits contained in the word are replaced and converted into a serial bit string. The processor operates the parallel/serial converter in the first mode when a flag, which indicates an arrangement order of bits and is contained in a header of a file storing the DSD data, indicates the MSB (Most Significant Bit) first and operates the parallel/serial converter in the second mode when the flag indicates the LSB (Least Significant Bit) first.

Any combinations of the above-described elements or any modifications to the representations of the present disclosure between methods, apparatuses and systems are effective as embodiments of the present disclosure.

BRIEF DESCRIPTION OF THE DRAWINGS

FIG. 3A is a view showing a plurality of noise patterns PAT, and FIG. 3B is a view showing an operation waveform of a silent pattern generator.

DETAILED DESCRIPTION

Figure 1:
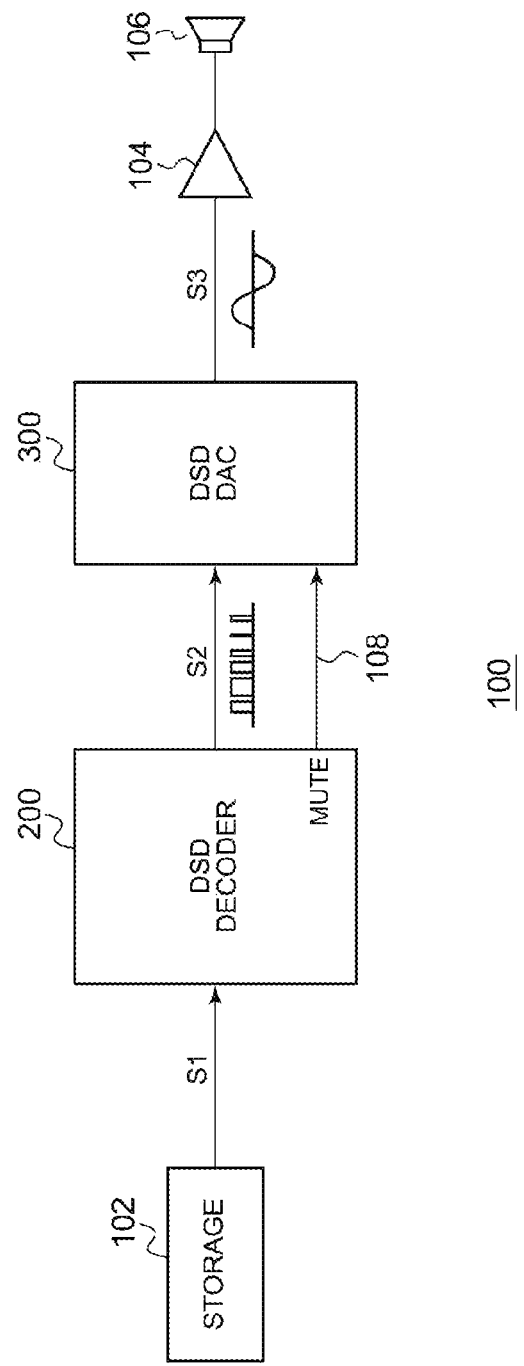
FIG. 1 is a block diagram of an audio system that reproduces DSD data.

Embodiments of the present disclosure will now be described in detail with reference to the drawings. Throughout the drawings, the same or similar elements, members and processes are denoted by the same reference numerals and explanation of which may not be repeated. The disclosed embodiments are provided for the purpose of illustration, not limitation, of the present disclosure and all features and combinations thereof described in the embodiments cannot be necessarily construed to describe the substance of the present disclosure.

In the specification, the expression of ""a state where a member A is connected with a member B"" includes, in addition to a case where the member A and the member B are physically directly connected, a case where the member A and the member B are indirectly connected through another member which does not affect the electrical connection between the member A and the member B. In addition, the expression of "a state where a member C is installed between a member A and a member B"" includes, in addition to a case where the member A and the member C or the member B and the member C are directly connected, a case where the member A and the member C or the member B and the member C are indirectly connected via another member which does not affect the electrical connection between the member A and the member C or between the member B and the member C.

Figure 2:
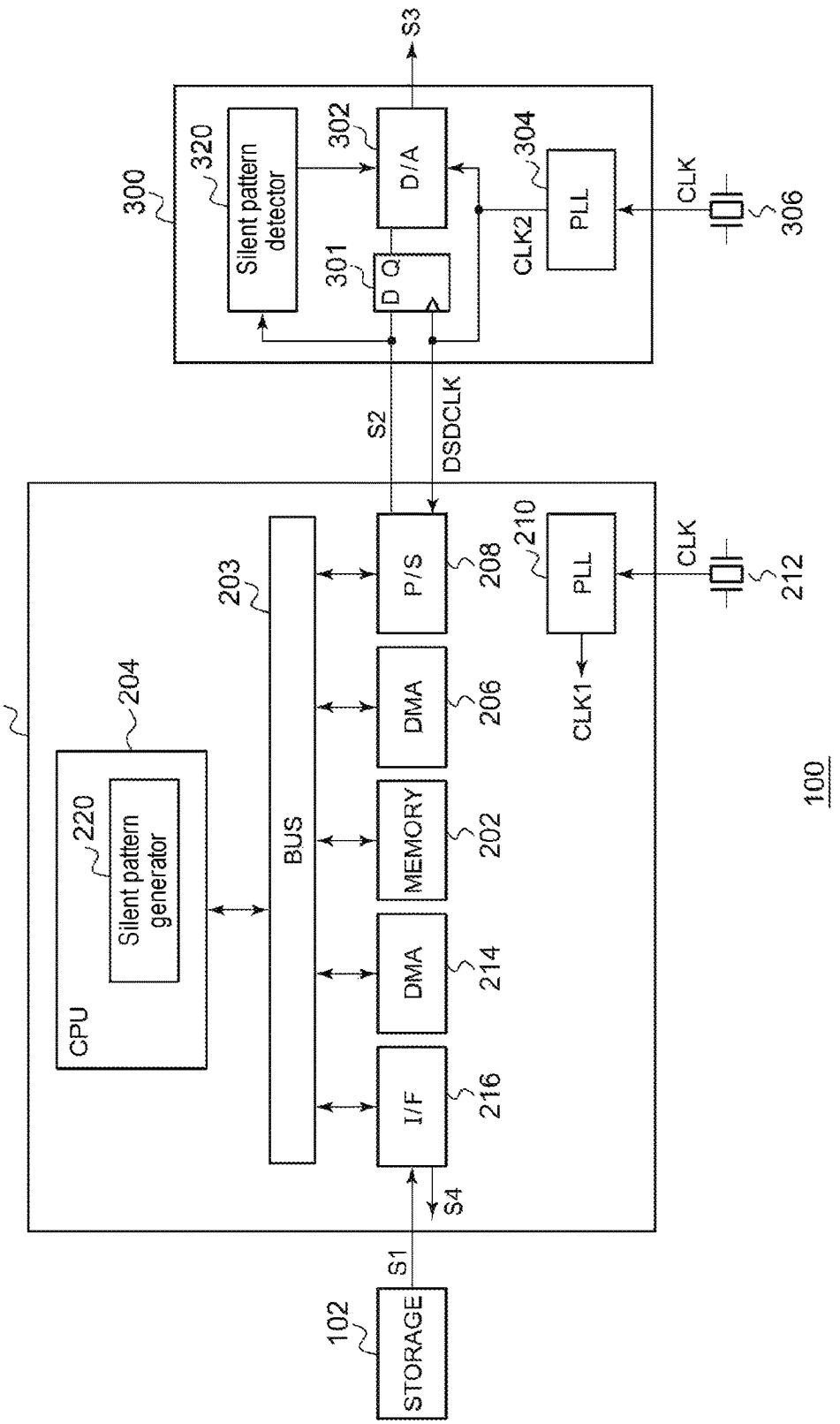
FIG. 2 is a block diagram of an audio system having a DSD decoder according to an embodiment.

FIG. 2 is a block diagram of an audio system 100 having a DSD decoder 200 according to an embodiment. The amplifier 104 and the speaker 106 shown in FIG. 1 are omitted in FIG. 2.

The DSD decoder 200 receives external DSD data S1 and converts the DSD data S1 into an audio signal S2 of a bit stream format. For example, a storage 102 storing the DSD data S1 is connected to the DSD decoder 200. A USB (Universal Serial Bus) may be used as an interface between the storage 102 and the DSD decoder 200.

The DSD decoder 200 may be an SoC (System on Chip) including a bus 203, a memory 202, a CPU (Central Processing Unit) 204, a DMA controller 206, a P/S (Parallel/Serial) converter 208, a PLL (Phase Locked Loop) circuit 210, an external oscillator 212, a DMA controller 214 and an interface circuit 216.

The interface circuit 216 receives DSD data from the storage 102. In response to a DMA transfer command from the CPU 204, the DMA controller 214 transfers the DSD data received by the interface circuit 216 to the memory 202. The DSD data are transferred from the storage 102 to the interface circuit 216 on a sector basis. The one sector consists of, for example, 512 bytes or 1024 bytes.

In response to a DMA transfer command from the CPU 204, the DMA controller 206 reads the DSD data stored in the memory 202 in the unit of one word. The P/S converter 208 serializes a plurality of bits (e.g., 8 bits) included in one word read by the DMA controller 206 and outputs the serialized bits in a bit stream format.

The PLL circuit 210 receives a reference clock signal CLK from the external oscillator 212 and generates a first clock signal CLK1 by multiplying the reference clock signal CLK. The CPU 204 and other blocks of the DSD decoder 200 operate in synchronization with the first clock signal CLK1. In addition, the number of PLL circuits 210 may be two or more. For example, a PLL circuit for supplying a clock to the CPU 204 and a PLL circuit for supplying a clock to the P/S converter 208 may be provided.

A flip-flop 301 of the D/A converter 300 latches (retimes) the DSD audio data S2 of a bit stream format using an edge of a clock signal DSDCLK. A D/A converting part 302 converts the bit stream retimed at the flip-flop 301 into an analog audio signal S3. The configuration of the D/A converting part 302 is not particularly limited. For example, the D/A converting part 302 may be configured with a low pass filter. Alternatively, the D/A converting part 302 may convert DSD data into PCM (Pulse Code Modulation) data and then convert the PCM data into an analog signal.

The external oscillator 306 is externally attached to the D/A converter 300 and generates the reference clock signal CLK. The PLL circuit 304 multiplies the reference clock signal CLK to generate a second clock signal CLK2. The D/A converting part 302 performs signal processing in synchronization with the second clock signal CLK2. As will be described later, the second clock signal CLK2 is supplied, as the clock signal DSDCLK, to the flip-flop 301 and to the DSD decoder 200.

The basic configuration of the audio system 100 has been described above. Subsequently, various features of the audio system 100 will be described in detail.

The DSD decoder 200 is equipped with a silent pattern generator 220. In this embodiment, the silent pattern generator 220 is implemented by software in a combination of the CPU 204 and a program executed by the CPU 204.

The silent pattern generator 220 is configured to generate a plurality of silent patterns PAT having different values. Each of the silent patterns PAT consists of M bits (where, M is an integer of 2 or more) and is set to have a mark rate (a ratio of 1 and 0) of 50%. For example, if a silent pattern PAT consists of one word (M=8 bits), four bits are "1" and the remaining four bits are "0." The silent patterns PAT are independent of the DSD data read from the storage 102.

FIG. 3A is a view showing a plurality of silent patterns PAT. A silent pattern PAT1 is [01010101] which is 0x55 in hexadecimal. A silent pattern PAT2 is [01101001] which is 0x69 in hexadecimal. A silent pattern PAT3 is [00101101] which is 0x2D in hexadecimal. Alternatively, the silent patterns PAT may be ones obtained by inverting the silent patterns PAT1 to PAT3 or may be any other different patterns. The silent patterns PAT are not particularly limited.

The silent pattern generator 220 selectively outputs the plurality of silent patterns PAT in a time division manner during a silence period. The silence period may be inserted between songs, in a blank before a song, and in a blank after a song, etc., or may be a pause.

In response to the silent pattern generator 220, the D/A converter 300 is equipped with a silent pattern detector 320. The silent pattern detector 320 determines whether or not the audio data S2 of a bit stream format output from the DSD decoder 200 has a silent pattern.

For example, the silent pattern detector 320 may hold a plurality of silent patterns and detect a silent pattern by pattern matching. Alternatively, the silent pattern detector 320 may include an adder to add consecutive bits and determine a result of the addition as a silent pattern if the result of the addition is about ½ of the number of additions (added bit number). A detection method of the silent pattern detector 320 is not particularly limited. The silent pattern detector 320 may be implemented with hardware or with a combination of a CPU and software. Upon determining a silent pattern, the silent pattern detector 320 fixes the output of the D/A converting part 302 and enters a mute state.

FIG. 3B is a view showing an operation waveform of the silent pattern generator 220. The silent pattern generator 220 generates a plurality of silent patterns PAT1 to PAT3 in a predetermined order in a time division manner. For example, as shown in FIG. 3B, the plurality of silent patterns PAT1 to PAT3 may be cyclically generated once. Alternatively, the silent patterns PAT1 to PAT3 may be cyclically generated by a predetermined number of times. As another alternative, the silent patterns PAT1 to PAT3 may be generated according to a more complex predetermined order or randomly.

Figure 4A:
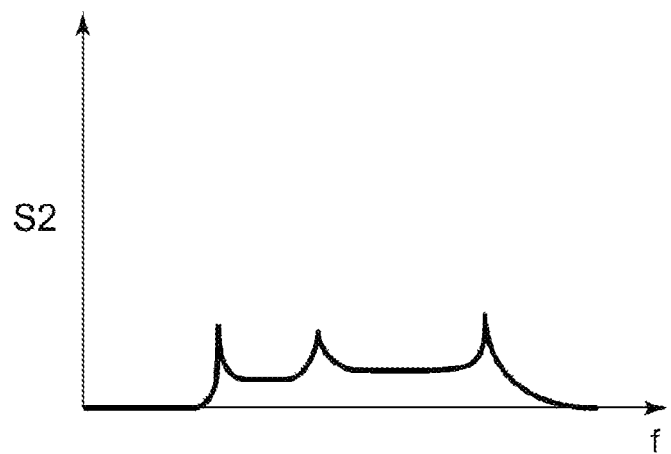
FIG. 4A is a spectrum of a bit stream in a mute state of the audio system according to an embodiment.
Figure 4B:
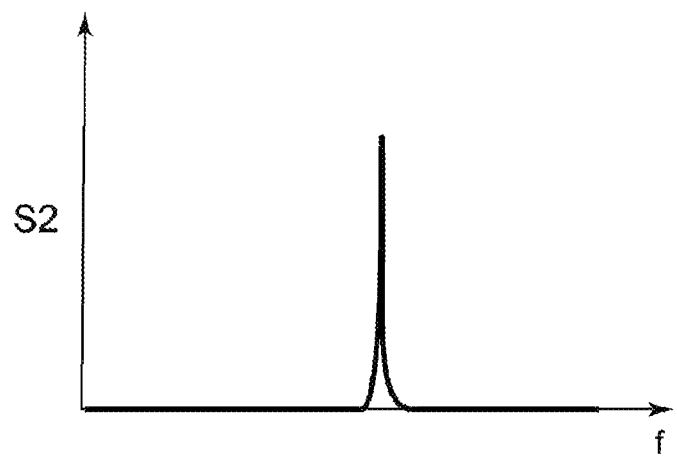
FIG. 4B is a spectrum of the bit stream when the same silent pattern is output fixedly.

FIG. 4A is a spectrum of the bit stream S2 in the mute state of the audio system 100 according to an embodiment, and FIG. 4B is a spectrum of the bit stream S2 when the same silent pattern is output fixedly. As shown in FIG. 4B, when the silent pattern is fixedly output, the silent pattern is concentrated on frequencies having a spectrum, which may cause a problem of noise radiation. In contrast, in the DSD decoder 200 according to the embodiment, the spectrum can be spread by switchedly outputting a plurality of silent patterns having different values, which can suppress the noise radiation.

If the silent pattern detector 320 equipped in the D/A converter 300 uses pattern matching, it is necessary to match a silent pattern expected by the silent pattern detector 320 with a silent pattern generated by the silent pattern generator 220. In this embodiment, since the silent patterns PAT are set by software, specifically, described in a software program executed by the CPU 204, the silent pattern expected by the silent pattern detector 320 may be used to describe a software program.

Alternatively, the silent patterns PAT may be statically or dynamically set from outside. For example, all bits in a bit string (i.e., values of the silent patterns) may be designated or a plurality of predetermined patterns may be selected. When the silent patterns are set from outside, setting values may be written from an external IC into a register via an I²C (Inter IC) bus.

This allows a designer of the audio system 100 to generate silent patterns appropriate for the silent pattern generator 220 depending on makers, forms and the like of the D/A converter 300 used in conjunction with the DSD decoder 200. That is, the DSD decoder 200 can have versatility allowing combinations with a variety of D/A converters 300.

Figure 5A:
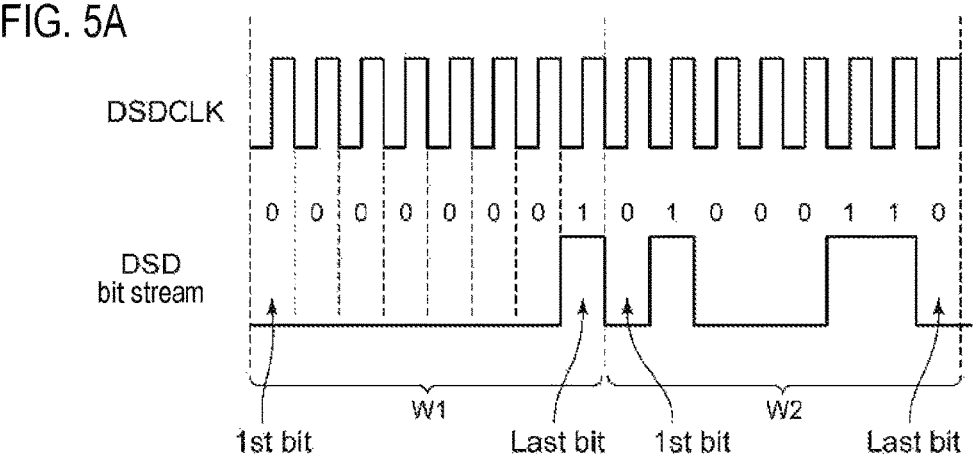
FIG. 5A is a view showing a bit stream corresponding to an audio waveform.

Subsequently, encoding and decoding of DSD data will be described. A DSF file is known as a file format of DSD data. In the DSF file, a bit stream of DSD data is held in one word-8 bit unit. There are two ways, i.e., a way of storing bits of one word in the LSB first and a way of storing bits of one word in the MSB first. FIG. 5A is a view showing a bit stream corresponding to an audio waveform, FIG. 5B is a view showing encoding of the LSB first, and FIG. 5C is a view showing encoding of the MSB first.

As shown in FIG. 5A, each consecutive 8-bit string is encoded as one word. Bits of the first word W1 are [00000001] and bits of the second word W2 are [01000110].

Figure 5B:
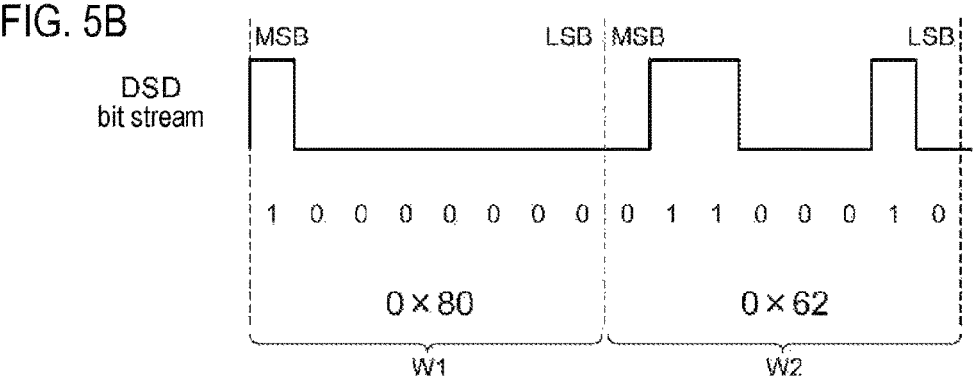
FIG. 5B is a view showing encoding of the LSB first.

As shown in FIG. 5B, in encoding in the LSB first, the order of arrangement of bits is reversed such that the first bit corresponding to the head on a time axis is the LSB and the eighth (last) bit corresponding to the last on the time axis is the MSB. As a result, the first and second words W1 and W2 become [10000000] and [01100010], respectively, which correspond to 0x80 and 0x62 in hexadecimal, respectively.

Figure 5C:
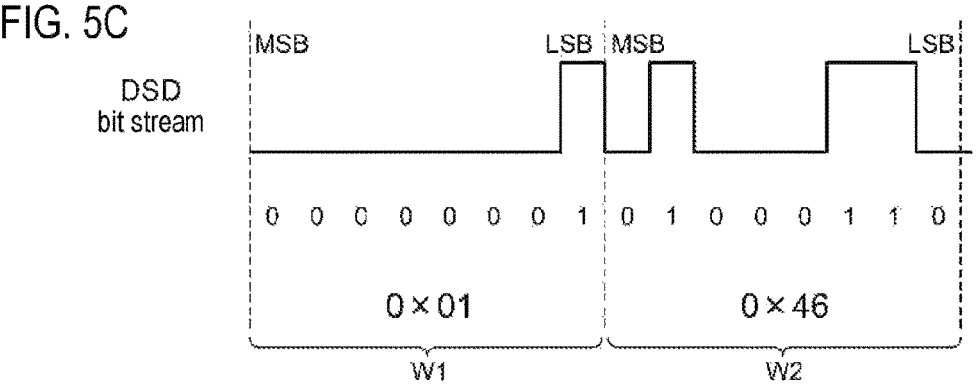
FIG. 5C is a view showing encoding of the MSB first.

As shown in FIG. 5C, in encoding in the MSB first, the first bit corresponding to the head on the time axis is MSB and the eighth (last) bit corresponding to the last on the time axis is LSB, i.e., the order of arrangement of bits is unchanged. As a result, the first and second words W1 and W2 become [00000001] and [01000110], respectively, which correspond to 0x01 and 0x46 in hexadecimal, respectively.

Whether an encoding format is the LSB first or the MSB first is determined by data (flag) "Bits per sample"" contained in a header of the DSF file. If a value of the flag is "1,"" this means the LSB first. If a value of the flag is "8,"" this means the MSB first.

In the DSD decoder 200 that reproduces the DSF file, if an encoding scheme is the LSB first, a function of inverting an arrangement order of bits is necessary. This process causes the following problem when it is performed in software by the CPU 204.

Since many of the general-purpose CPUs do not have a function (standard command or mnemonic) of inverting an arrangement order of bits, it is necessary to rearrange bits by using a routine for rearranging bits in a software program, reading each word to an accumulator or a register by means of the CPU 204, and executing a plurality of commands. Therefore, a load of the CPU may be increased. Accordingly, it is necessary to increase a CPU clock frequency in order to perform real-time reproduction.

Therefore, one of the features of the DSD decoder 200 according to some embodiments is to rearrange bits by hardware process, rather than by software process by the CPU.

In a first embodiment, a bit rearrangement function is implemented in the DMA controller 206. The DMA controller 206 is configured to switch between (i) a first mode in which one word is output without change and (ii) a second mode in which an order of arrangement of bits contained in one word is inverted and a rearranged word is output.

The CPU 204 sets an operation mode of the DMA controller 206 based on a flag ("Bits per Sample"), which indicates an rearrangement order of bits and is contained in a header of a file storing DSD data. For example, the P/S converter 208 at the subsequent stage may be configured to output a plurality of bits included in one word in a bit stream format of the MSB first. At this time, the CPU 204 operates the DMA controller 206 in the first mode when the flag indicates the MSB (Most Significant Bit) first (i.e., a value of 8) and operates the DMA controller 206 in the second mode when the flag indicates the LSB (Least Significant Bit) first (i.e., a value of 1).

On the contrary, the P/S converter 208 at the subsequent stage may be configured to output a plurality of bits included in one word in a bit stream format of the LSB first. At this time, the CPU 204 operates the DMA controller 206 in the second mode when the flag indicates the MSB (Most Significant Bit) first (i.e., a value of 8) and operates the DMA controller 206 in the first mode when the flag indicates the LSB (Least Significant Bit) first (i.e., a value of 1).

Figure 6:
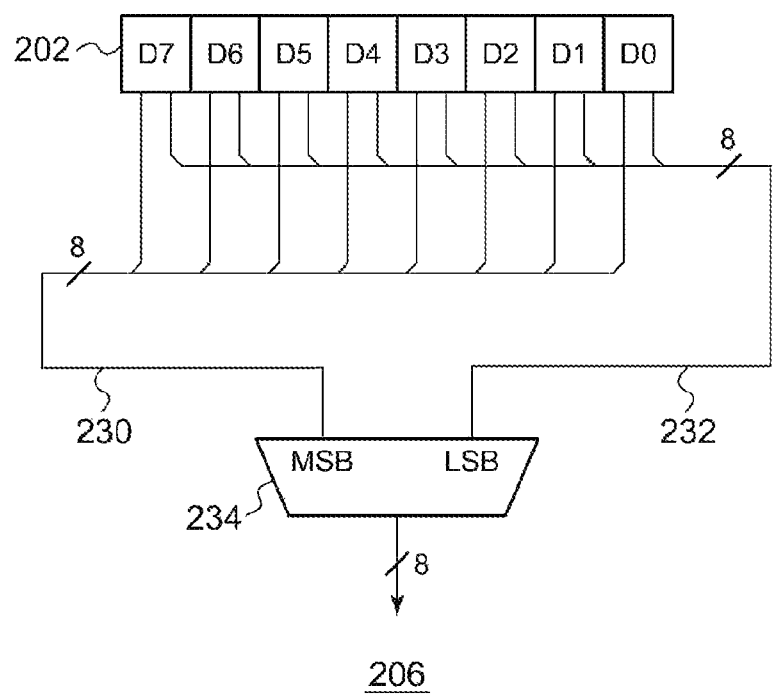
FIG. 6 is a circuit diagram showing a configuration example of a DMA controller capable of mode switching.

FIG. 6 is a circuit diagram showing a configuration example of the DMA controller 206 capable of mode switching. In FIG. 6, only a part of the configuration of the DMA controller 206 is shown and an address selector and so on is omitted. Output data (one word) of the memory 202 are input to a first data line 230 in the first order (the MSB first) and output data (one word) of the memory 202 are input to a second data line 232 in the second order (the LSB first). A selector 234 selects the first data line 230 in the first mode (the MSB first) and selects the second data line 232 in the second mode (the LSB first). The DMA controller 206 is not particularly limited in the above configuration but may be configured in different ways.

In a second embodiment, a bit rearrangement function is implemented in the P/S converter 208. The P/S converter 208 is configured to switch between (i) a first mode in which one word output from the DMA controller 206 is converted into a serial bit string and (ii) a second mode in which bits contained in one word are replaced and converted into a serial bit string.

The CPU 204 sets an operation mode of the P/S converter 208 based on a flag ("Bits per Sample"), which indicates an rearrangement order of bits and is contained in a header of a file storing DSD data. For example, the DMA controller 206 may be configured to output one word without change. At this time, the CPU 204 operates the P/S converter 208 in the first mode when the flag indicates the MSB (Most Significant Bit) first (i.e., a value of 8) and operates the P/S converter 208 in the second mode when the flag indicates the LSB (Least Significant Bit) first (i.e., a value of 1).

On the contrary, the DMA controller 206 may be configured to invert an arrangement order of bits contained in one word and output a rearranged word. At this time, the CPU 204 operates the P/S converter 208 in the second mode when the flag indicates the MSB (Most Significant Bit) first (i.e., a value of 8) and operates the P/S converter 208 in the first mode when the flag indicates the LSB (Least Significant Bit) first (i.e., a value of 1).

Figure 7:
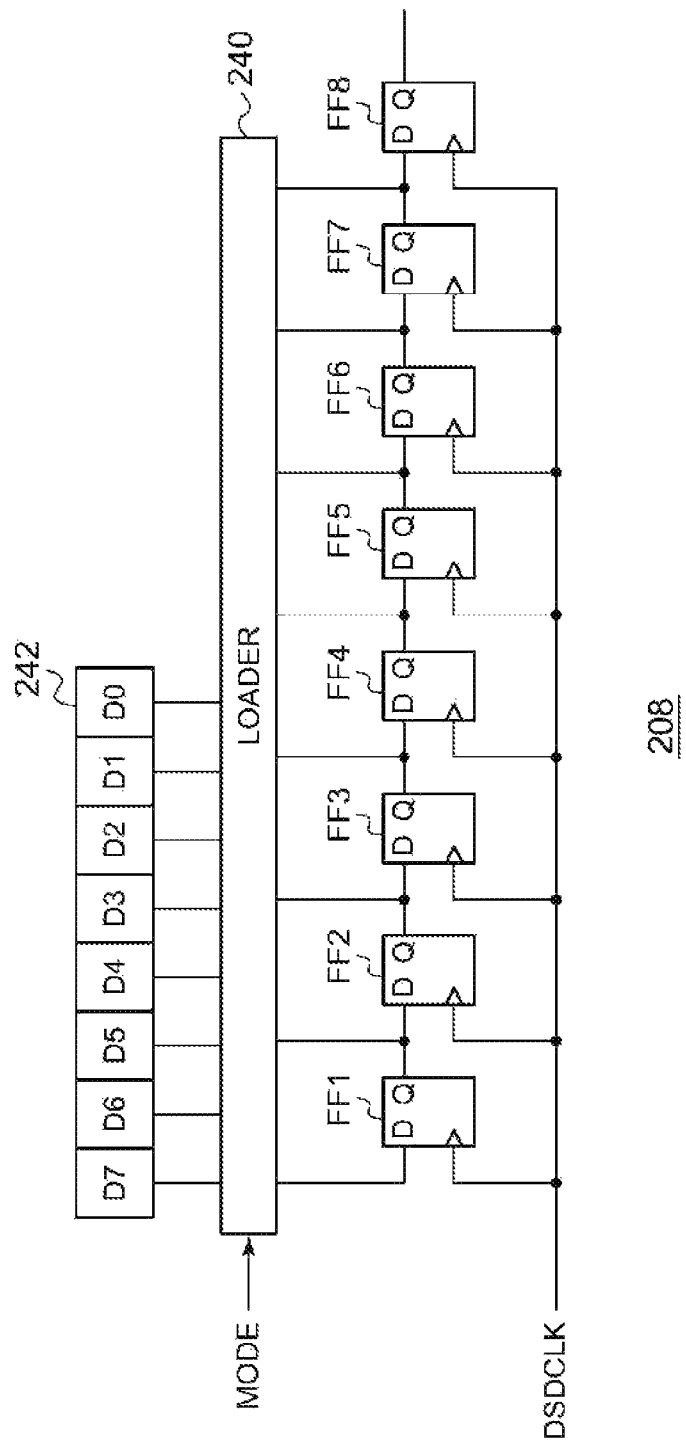
FIG. 7 is a circuit diagram showing a configuration example of a P/S converter capable of mode switching.

FIG. 7 is a circuit diagram showing a configuration example of the P/S converter 208 capable of mode switching. The P/S converter 208 includes a plurality of flip-flops FF1 to FF8 and a data loader 240. The data loader 240 is configured to switch between (i) a state in which bits D7 to D0 of parallel data 242 are loaded in parallel such that the bits D7 to D0 are respectively input to the flip-flops FF1 to FF8 and (ii) a state in which the bits D7 to D0 are loaded in parallel such that the bits D7 to D0 are respectively input to the flip-flops FF8 to FF1. The P/S converter 208 is not particularly limited in the above configuration but may be configured in different ways.

Thus, a load of the CPU 204 can be reduced when the rearrangement function of bits contained in one word is implemented in hardware. Thus, an operation clock frequency of the CPU 204 can be lowered, which results in reduction of power consumption.

Subsequently, features related to improvement of sound quality of the audio system 100 will be described. As shown in FIG. 2, in this embodiment, a clock signal for serial transfer is supplied from the D/A converter 300 to the decoder 200. The clock signal is the clock signal CLK2 generated by the PLL circuit 304, and may be the clock signal DSDCLK or an original master clock of the clock signal DSDCLK. The P/S converter 208 of the DSD decoder 200 performs parallel serial conversion in synchronization with the clock signal DSDCLK from the D/A converter 300 and outputs decoded DSD data. In the D/A converter 300, the D/A converting part 302 latches bits of the bit stream from the DSD decoder 200 using the clock signal CLK2, i.e., the clock signal DSDCLK, generated in the D/A converter 300.

Figure 8A:
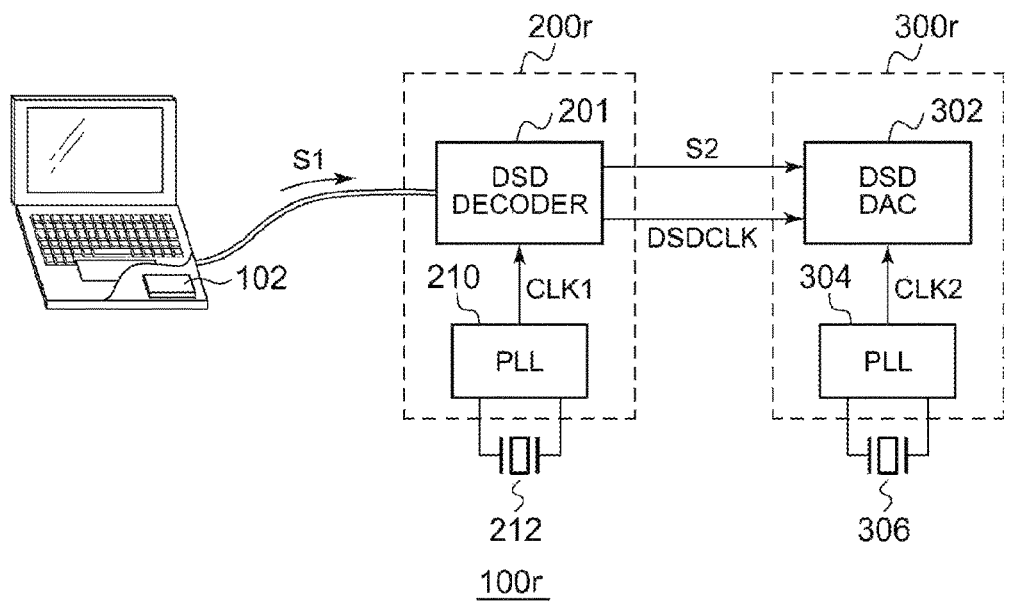
FIGS. 8A and 8B are views showing a conventional audio system and an audio system according to the embodiment, respectively.
Figure 8B:
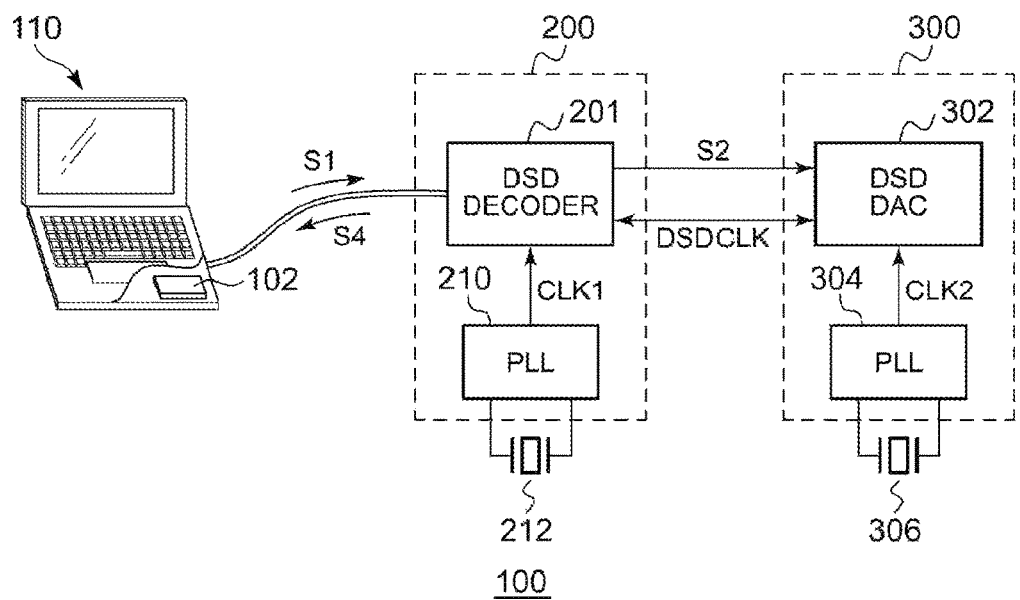

Advantages of this configuration will be described below. FIGS. 8A and 8B are views showing a conventional audio system 100r and an audio system 100 according to an embodiment, respectively. A problem of the conventional audio system 100r will first be described with reference to FIG. 8A. Reference numeral 201 denotes portions other than the PLL circuit 210 in the DSD decoder 200.

In the conventional audio system 100r, a clock signal CLK1 generated in a DSD decoder 200r is used as a clock signal DSDCLK for parallel serial conversion and is output to a D/A converter 300r along with a bit stream S2.

In the D/A converter 300r, the clock signal DSDCLK (CLK1) is used to latch bits of the bit stream S2. Thereafter, a D/A converting process is performed in synchronization with a second clock signal CLK2 originated from the external oscillator 306.

In this case, if there exists a frequency deviation between the external oscillators 212 and 306 of the DSD decoder 200r and the D/A converter 300r, respectively, a frequency deviation occurs between the first clock signal CLK1 (DSDCLK) and the second clock signal CLK2. With an increase in the frequency deviation, there occurs a difference between data amount supplied from the DSD decoder 200r to the flip-flop 301 and data amount which can be processed by the D/A converting part 302. If the former is more, an overflow occurs. If the latter is more, an underflow occurs. This may result in deterioration of sound quality.

On the contrary, in the audio system 100 according to the embodiment, as shown in FIG. 8A and FIG. 2, the second clock signal CLK2 is used as the clock signal DSDCLK and is supplied from the D/A converter 300 to the DSD decoder 200. Thus, even when a frequency deviation occurs between the DSD decoder 200 and the D/A converter 300, since there is a balance between the data amount supplied to the flip-flop 301 and data amount which can be processed by the D/A converting part 302, it is possible to prevent an overflow and an underflow from occurring in the D/A converter 300 and even improve sound quality.

As shown in FIG. 8B, the storage 102 is equipped in a computer 110 and the computer 110 and the DSD decoder 200 are interconnected via a serial bus such as a USB (Universal Serial Bus) or the like. In this case, the interface circuit 216 shown in FIG. 2 is a USB interface (i.e., a transceiver or receiver). A USB interface at the computer 110 side transmits DSD data stored in the storage 102 to the DSD decoder 200 on a predetermined unit (one sector) basis. The interface circuit 216 and the DMA controller 214 store the received DSD data in the memory 202.

The interface circuit 216 outputs control data S4, which indicates a DSD data transfer rate, to the computer 110 so as to make a balance between the data amount supplied from the storage 102 to the memory 202 and the data amount processed by the DSD decoder 200 and output to the D/A converter 300. Many OSs (Operating Systems) including Windows® support control of a data transfer rate in its driver layer. The DSD decoder 200 may use this function of the driver layer by the control data S4 to control the data transfer rate.

Thus, even in the DSD decoder 200, since it is possible to make a balance between the data amount supplied from the storage 102 and the data amount processed by the DSD decoder 200, it is possible to prevent an overflow and an underflow from occurring in the DSD decoder 200 and even improve sound quality.

The present disclosure describes some embodiments as above. The embodiments are disclosed by way of example only, and thus, it should be understood by those skilled in the art that various modifications or combinations of the elements or processes above may be made and such modifications will also fall within the scope of the present disclosure. Some modifications will be described below.
(First Modification)

Although it has been illustrated in the above embodiment that the silent pattern generator 220 is implemented in software by a combination of the CPU 204 and the program executed by the CPU 204, the entire or a portion of the silent pattern generator 220 may be implemented by hardware. For example, the silent patterns may be set in software and the CPU 204 may control silent patterns generated by hardware of the silent pattern generator 220 according to a software program. The same effects of the above embodiment can be obtained by this modification.
(Second Modification)

Figure 9:
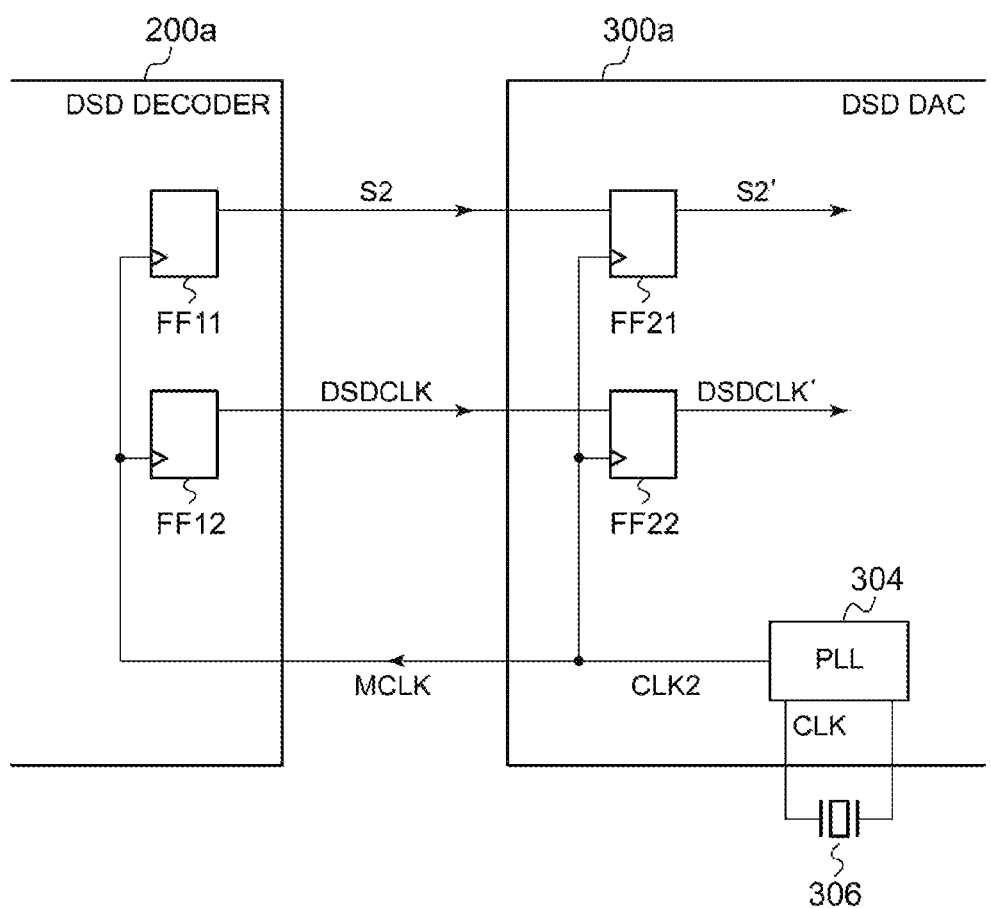
FIG. 9 is a block diagram of a portion of an audio reproduction system according to a second modification.

Although it has been shown in FIG. 2 that the flip-flop 301 uses the clock signal DSDCLK to latch the audio data S2, the present disclosure is not limited thereto. FIG. 9 is a block diagram of a portion of an audio reproduction system 100a according to a second modification.

A second clock signal CLK2 generated by a PLL circuit 304 of a D/A converter 300a is supplied, as a master clock MCLK for serial transfer, to a DSD decoder 200a. The PLL circuit 304 may be omitted and a clock generated by an external oscillator 306 may be used as the second clock CLK2.

Flip-flops FF11 and FF12 output audio data S2 and a clock signal DSDCLK, respectively, to the D/A converter 300a in synchronization with the master clock MCLK. Flip-flops FF21 and FF22 receive the audio data S2 and the clock signal DSDCLK, respectively, in synchronization with the second clock signal CLK2. A D/A converting part (not shown) at the subsequent stage converts audio data S2' output from the flip-flop FF21 in an analog audio signal S3 in synchronization with a clock signal DSDCLK' from the flip-flop FF22. This modification can also obtain the same effects as the above embodiment.

According to the present disclosure in some embodiments, it is possible to reduce radiation noise.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A decoder that decodes DSD (Direct Stream Digital) data, comprising:
a memory storing the DSD data;
a processor;
a DMA (Direct Memory Access) controller configured to read the DSD data from the memory one word at a time according to a command from the processor;
a parallel/serial converter configured to output a plurality of bits contained in a word read by the DMA controller in a bit stream format of either MSB (Most Significant Bit) first or LSB (Least Significant Bit) first; and
a silent pattern generator configured to selectively output a plurality of silent patterns in a time division manner during a silence period, wherein each of the plurality of silent patterns has a mark rate of 50% and is a string of bits having different values,
wherein the DMA controller is configured to switch between (i) a first mode in which the word is output without change and (ii) a second mode in which an arrangement order of bits contained in the word is inverted and a rearranged word is output,
wherein the processor operates the DMA controller in the first mode when a flag, which indicates a bit arrangement order and is contained in a header of a file storing the DSD data, corresponds to the bit stream format of the bits output from the parallel/serial converter, and
wherein the processor operates the DMA controller in the second mode when the flag does not correspond to the bit stream format of the bits output from the parallel/serial converter.

2. The decoder of claim 1, wherein the silent patterns are set in software.

3. The decoder of claim 1,
wherein when the parallel/serial converter outputs the plurality of bits contained in the word in the bit stream format of the MSB first, the processor operates the DMA controller in the first mode if the flag corresponds to the MSB first and operates the DMA controller in the second mode if the flag corresponds to the LSB (Least Significant Bit) first.

4. The decoder of claim 1,
wherein when the parallel/serial converter outputs the plurality of bits contained in the word in the bit stream format of the LSB first, the processor operates the DMA controller in the second mode if the flag corresponds to the MSB (Most Significant Bit) first and operates the DMA controller in the first mode if the flag corresponds to the LSB first.

5. An audio system comprising:
the decoder of claim 1; and
a D/A converter configured to convert decoded DSD data output from the decoder into an analog signal;
wherein a clock signal for serial transfer is supplied from the D/A converter to the decoder, and
wherein the parallel/serial converter of the decoder outputs the decoded DSD data in synchronization with the clock signal.

6. The audio system of claim 5, further comprising a storage storing an audio file of a DSD format,
wherein the decoder includes an interface circuit which receives the DSD data from the storage and stores the received DSD data in the memory.

7. The audio system of claim 6, wherein the storage is equipped in a computer, and
wherein the interface circuit outputs data indicating a transfer rate of the DSD data to the computer.

8. A decoder that decodes DSD (Direct Stream Digital) data, comprising:
a memory storing the DSD data;
a processor;
a DMA (Direct Memory Access) controller configured to read the DSD data from the memory one word at a time according to a command from the processor and outputs the word without change or inverts an arrangement order of bits contained in the word and outputs a rearranged word;
a parallel/serial converter configured to output a plurality of bits contained in a word read by the DMA controller in a bit stream format; and
a silent pattern generator configured to selectively output a plurality of silent patterns in a time division manner during a silence period, wherein each of the plurality of silent patterns has a mark rate of 50% and is a string of bits having different values,
wherein the parallel/serial converter is configured to switch between (i) a first mode in which the word output from the DMA controller is converted into a serial bit string without change and (ii) a second mode in which bits contained in the word are replaced and converted into a serial bit string,
wherein the processor operates the parallel/serial converter in the first mode when a flag, which indicates a bit arrangement order and is contained in a header of a file storing the DSD data, corresponds to the arrangement order of bits contained in the word output from the DMA controller, and
wherein the processor operates the parallel/serial converter in the second mode when the flag does not correspond to the arrangement order of bits contained in the word output from the DMA controller.

9. The decoder of claim 8,
wherein the DMA controller inverts the arrangement order of bits contained in the word and outputs the rearranged word, and
wherein the processor operates the parallel/serial converter in the second mode when the flag corresponds to the MSB first and operates the parallel/serial converter in the first mode when the flag corresponds to the LSB (Least Significant Bit) first.

10. The decoder of claim 8, wherein the DMA controller outputs the word without change, and,
wherein the processor operates the parallel/serial converter in the first mode when the flag corresponds to the MSB first and operates the parallel/serial converter in the second mode when the flag corresponds to the LSB first.

* * * * *